United States Patent
Chen et al.

(10) Patent No.: US 12,160,646 B2
(45) Date of Patent: *Dec. 3, 2024

(54) VIDEO CAMERA WITH ALIGNMENT FEATURE

(71) Applicant: MOTOROLA SOLUTIONS, INC., Chicago, IL (US)

(72) Inventors: Guo Wei Chen, Chicago, IL (US); Chi T Tran, Naperville, IL (US); Imadi Safwan Samsudin, Kulim (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 306 days.

This patent is subject to a terminal disclaimer.

(21) Appl. No.: 17/836,259

(22) Filed: Jun. 9, 2022

(65) Prior Publication Data
US 2023/0008347 A1    Jan. 12, 2023

Related U.S. Application Data

(63) Continuation of application No. 17/368,388, filed on Jul. 6, 2021, now Pat. No. 11,388,317.

(51) Int. Cl.
*H04N 23/51* (2023.01)
*G03B 11/04* (2021.01)
(Continued)

(52) U.S. Cl.
CPC ............. *H04N 23/51* (2023.01); *G03B 11/04* (2013.01); *H04N 7/18* (2013.01); *H04N 23/54* (2023.01)

(58) Field of Classification Search
CPC .......... H04N 23/51; H04N 23/54; H04N 7/18; G03B 11/04
(Continued)

(56) References Cited

U.S. PATENT DOCUMENTS 8,345,989 B1 *   1/2013   Bresolin ............ G01N 21/9508
                                                              382/218
D734,380 S       7/2015   Tzarnotzky et al.
(Continued)

FOREIGN PATENT DOCUMENTS

| CN | 109257526 A | 1/2019 |
| EP | 3448012 B1 | 8/2020 |
| JP | 2021047448 A1 | 3/2021 |

OTHER PUBLICATIONS

The International Search Report and the Written Opinion, corresponding Patent Application No. PCTUS2022/035415, filed: Jun. 29, 2022, mailed Sep. 20, 2022, all pages.

(Continued)

*Primary Examiner* — Matthew David Kim
(74) *Attorney, Agent, or Firm* — Barbara R Doutre; Miles I Polley

(57) ABSTRACT

A video camera comprises a housing (102) configured of a top housing portion (104), a mid-housing portion (106) and a bottom housing portion (108). The top housing portion is configured as a circular and rounded exterior contoured wall (110) having an exterior recessed feature (112) formed along an edge (114). The mid-housing portion (106) is formed of an IR window ring (116) having an alignment tab (118) extending therefrom, the alignment tab being aligned and recessed within the exterior recessed feature (112) of the rounded exterior contoured wall (110) of the top housing portion (104), and the bottom housing portion (108) providing a camera dome (120) seated within and protruding from the IR window ring (116).

16 Claims, 12 Drawing Sheets

(51) Int. Cl.
  *H04N 7/18* (2006.01)
  *H04N 23/54* (2023.01)
(58) Field of Classification Search
  USPC .......................................................... 348/143
  See application file for complete search history.

(56) References Cited

U.S. PATENT DOCUMENTS

| | | | | |
|---|---|---|---|---|
| D768,751 | S | 10/2016 | Sarwari | |
| D796,567 | S | 9/2017 | Bingleman et al. | |
| D815,677 | S | 4/2018 | Gao et al. | |
| 2003/0121927 | A1* | 7/2003 | Rice | F42B 39/26 220/835 |
| 2003/0136005 | A1* | 7/2003 | Panfili | A47L 13/022 30/162 |
| 2009/0162048 | A1* | 6/2009 | Tatewaki | G08B 13/19628 396/427 |
| 2010/0128446 | A1 | 5/2010 | Dipoala | |
| 2013/0342982 | A1* | 12/2013 | DiPoala | H05K 5/0256 361/679.01 |
| 2014/0301729 | A1* | 10/2014 | Okamura | H04N 23/50 396/427 |
| 2014/0348498 | A1* | 11/2014 | Aiba | G03B 13/34 396/79 |
| 2015/0177596 | A1* | 6/2015 | Bergsten | G03B 17/561 248/205.1 |
| 2017/0111557 | A1* | 4/2017 | Ko | G02B 5/208 |
| 2018/0165932 | A1* | 6/2018 | Larsson | H04N 23/55 |
| 2019/0020800 | A1* | 1/2019 | Fujii | H04N 23/52 |
| 2019/0068892 | A1* | 2/2019 | Yasutake | H04N 23/55 |
| 2019/0227304 | A1* | 7/2019 | Eftekhari | G03B 17/04 |
| 2020/0120239 | A1* | 4/2020 | Bingleman | G08B 13/19632 |

OTHER PUBLICATIONS

Avigilon H4 Fisheye, https://www.avigilon.com/products/cameras-sensors/h4-fisheye, 2020, downloaded from the Internet Jun. 28, 2021, all pages.
Axis M3057-PLVE Network Camera—https://www.axis.com/en-us/products/axis-m3057-plve, 2018-2021, downloaded from the internet Jun. 28, 2021, all pages.
Axis M3037-PVE Network Camera—https://www.axis.com/en-us/products/axis-m3037-pve, 2015-2021, downloaded from the internet Jun. 28, 2021, all pages.
Dahua 4K HDCVI Fisheye camera—https://us.dahuasecurity.com/?product=4k-hdcvi-fisheye-camera, downloaded from the internet: Jun. 14, 2021, all pages.
Bosch Flexidome IP Panoramic 7000—https://commerce.boschsecurity.com/us/en/FLEXIDOME-IP-panoramic-7000-MP/p/15510211467/, Jan. 22, 2021, all pages.
Oncam Evolution 180, Evolution 12 & Evolution 05—https://www.oncamgrandeye.com/security-systems/indoor-cameras/, 2019, all pages.

* cited by examiner

VIDEO CAMERA WITH ALIGNMENT FEATURE

FIELD OF THE INVENTION

The present invention relates generally to video cameras and more particularly to a housing for improved assembly of a video camera.

BACKGROUND

Video cameras may be used in for both security and surveillance. Security cameras, also known as closed-circuit television (CCTV) cameras, are used to convey signals from one particular place to a monitor situated at a distance, whereas surveillance cameras normally work on Internet protocol (IP) networks which link the camera from a remote area to an assigned security location. In either application, the video camera often has an exposed camera dome which, over time, may become subjected to a variety of environmental conditions. The camera dome may become scratched or otherwise damaged and need to be replaced. Accordingly, a video camera that facilitates the ability to replace the camera dome is highly desirable.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
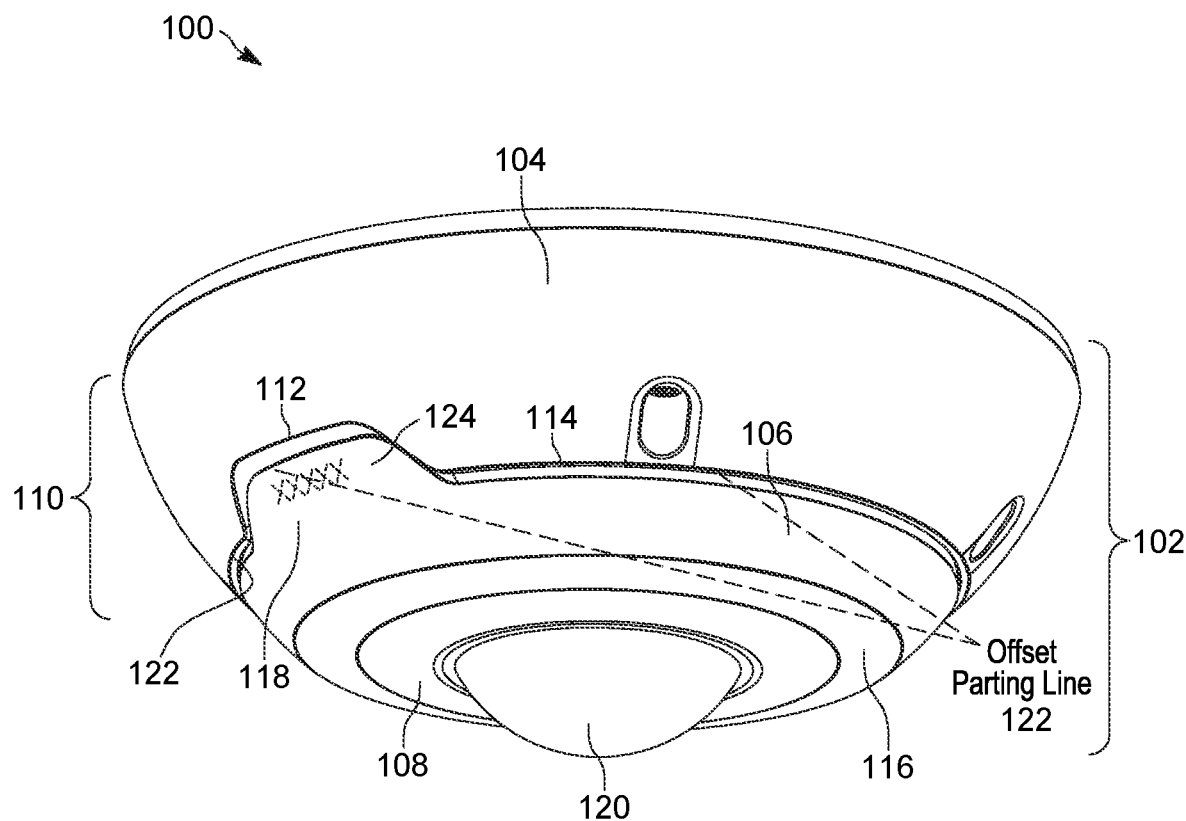
FIG. 1 is an isometric view of a housing for a video camera formed in accordance with some embodiments . . .

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in an improved housing configuration for a video camera which facilitates assembly at the factory level, facilitates installation at the customer level, and facilitates replacement of a camera dome. Accordingly, the components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Briefly, there is provided herein a video camera comprising a housing configured to provide improved assembly both at the manufacturing level and the installation level. For the purposes of this application, the video camera may a security camera, also known as a CCTV camera, or the video camera may be a surveillance camera, which works on an internet protocol (IP) network which links the camera from a remote area to an assigned security location. The housing configuration further advantageously facilitates the removal and replacement of the camera dome.

FIG. 1 is an isometric view 100 of a housing 102 for a video camera formed in accordance with some embodiments. The video camera housing 102 provides a plurality of housing portions for camera and IR electronics. The plurality of housing portions comprises a top housing portion 104, a mid-housing portion 106 and a bottom housing portion 108. The top housing portion 104, the mid-housing portion 106 and the bottom housing portion 108, may also be referred to as first, second, and third housing portions respectively. The top housing portion 104 is configured as a circular and rounded exterior contoured wall 110, the circular and rounded exterior contoured wall has an exterior recessed feature 112 formed along an edge 114. The top housing portion 104 may comprise a second opposing recessed feature 112' which will be shown in other views.

In accordance with some embodiments, the mid-housing portion 106 is formed of an infrared (IR) window ring 116 having an alignment tab 118 extending therefrom. The mid-housing portion 106 may comprise a second opposed alignment tab 118', which will be shown in other views. The alignment tab 118 is aligned and recessed within the exterior recessed feature 112 of the circular and rounded exterior contoured wall 110 of the top housing portion 104. The IR window ring 116 is formed of a material permeable to IR and opaque to visible light. The bottom housing portion 108 comprises a camera dome 120 seated within and protruding from the IR window ring 116. The top housing portion 104 is highly contrasted to the mid-housing portion 106 and bottom housing portion 108. Exterior recessed feature 112 with alignment tab 118 recessed therein provide a natural finger recess with affordance to facilitate gripping during assembly, during installation, and during removal and replacement of the camera dome 120. The dark contrast of the combined mid and bottom housing portions 106, 108 further beneficially protects the top housing portion 104 from getting dirty during handling.

The video camera of the various embodiments may also be referred to as a fisheye camera as it advantageously provides 360° panoramic views of large areas from a single vantage point. The fisheye camera provides superior situational awareness with no blind spots for a cost-effective solution, along with multiple mounting and accessory options for easy installation. The video camera may be one of an internet protocol (IP) camera or a closed circuit television (CCTV) camera. When using a wide-angle panoramic internet protocol (IP) camera, images are typically warped, which creates the effect of a fisheye. The IP camera is a type of digital video camera that receives control data and sends image data via an IP network. The IP camera may be used, for example, for surveillance but unlike analog closed-circuit television cameras, the IP camera requires no local recording device, only a local area network.

The video camera provided by the various embodiments advantageously provides an improved housing configuration that allows for ease of manufacturability, ease of installation, and improved ease of replacement of the dome camera. The video camera housing further includes an offset parting line 122 which is formed between the top housing portion 104 and the mid-housing portion 106. The offset parting line 122 helps to further recess and protect the printed branding insignia 124 on alignment tab 118. The parting line does not compromise water test specifications, such as IP66, IP67, and NEMA 4x hosedown. NEMA stands for National Electric Manufacturers Association which sets test specifications for gasket enclosure type products intended for indoor or outdoor use primarily to provide a degree of protection against windblown dust and rain, splashing water, and hose directed water; undamaged by ice which forms on the enclosure.

The alignment tab 118 forms a three-sided frame around a branding insignia 124 printed thereon. The three-sided frame provides improved prominence to the branding insignia 124. The IR window edge 114 with the offset parting line 122 running along the three-sided frame enhances protection to the recessed alignment tab 118 and branding insignia 124 printed thereon.

The housing 102 may be mounted to, and dismounted from, a circular mounting apparatus having video camera electronics (shown in other views), wherein the circular mounting apparatus is attached to a wall or ceiling.

Figure 2A:
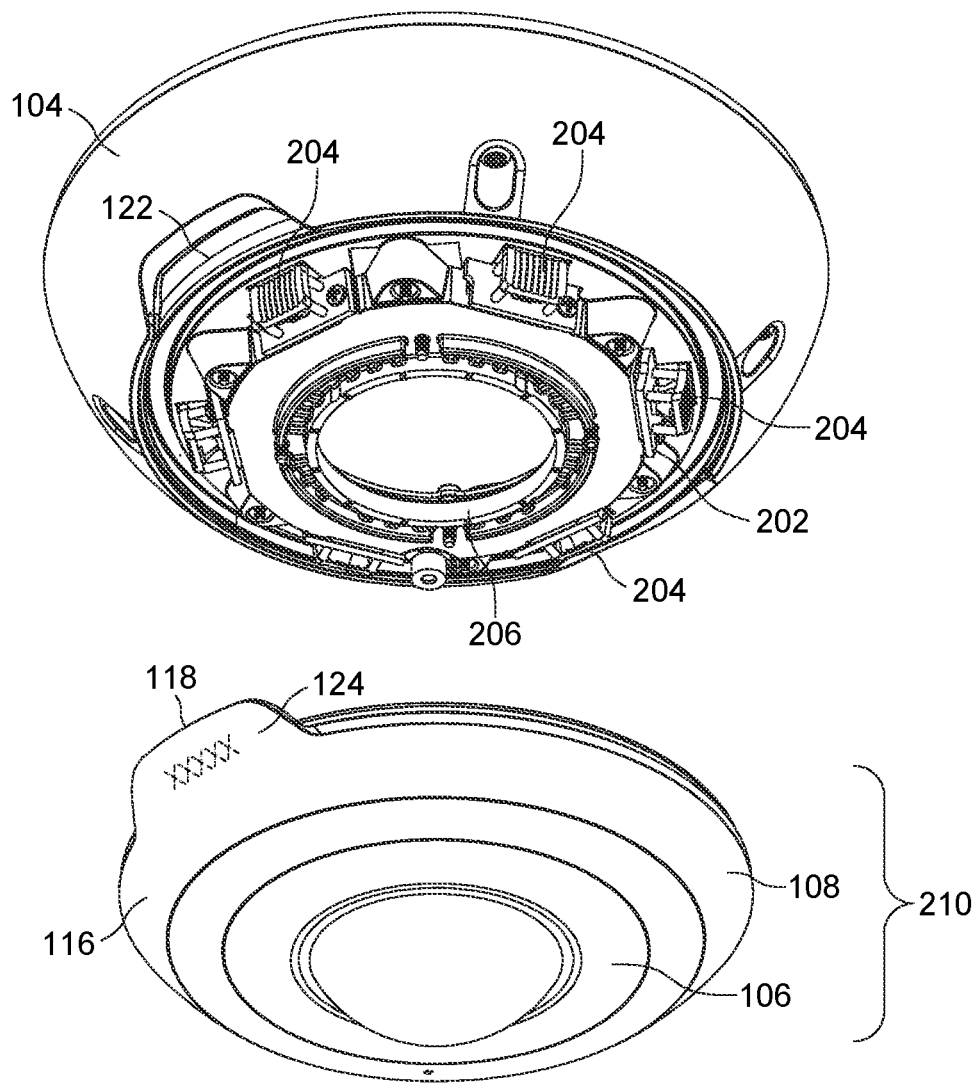
FIG. 2A is a partially assembled isometric view of the video camera housing formed in accordance with some embodiments.

FIG. 2A is a partially assembled isometric view of the video camera formed in accordance with some embodiments. This view shows the mid-housing portion 106 and bottom housing portion 108 coupled together as a sub-assembly 210 for mounting to the top housing portion 104. During manufacturing assembly, the sub-assembly 210 couples IR window ring 116 and camera dome 120, and then the sub-assembly 210 is coupled to the top housing portion 104. In accordance with the various embodiments, the IR window ring 116 is formed of a material permeable to IR and opaque to visible light. The IR window ring 116 further comprises the alignment tab 118 extending therefrom for aligning with the exterior recessed feature 112 of the top housing portion 104. The alignment tab 118 frames the branding insignia 124 printed on an exterior surface of the alignment tab. For example, the alignment tab 118 can frame a trademark or other wording or symbols to facilitate product recognition as well as facilitate assembly and disassembly. The top housing portion 104 includes IR electronics, such as IR circuitry 202 and IR lenslets 204, surrounding a pass-through opening 206 (for a camera lens located on the circular mounting apparatus—shown in other views). The lenslets 204 are positioned so as to align with the IR window ring 116. A sealing ring 208 provides sealing between the top housing portion 104 and the sub-assembly 210 formed of the mid and bottom housing portions 106, 108.

Figure 2B:
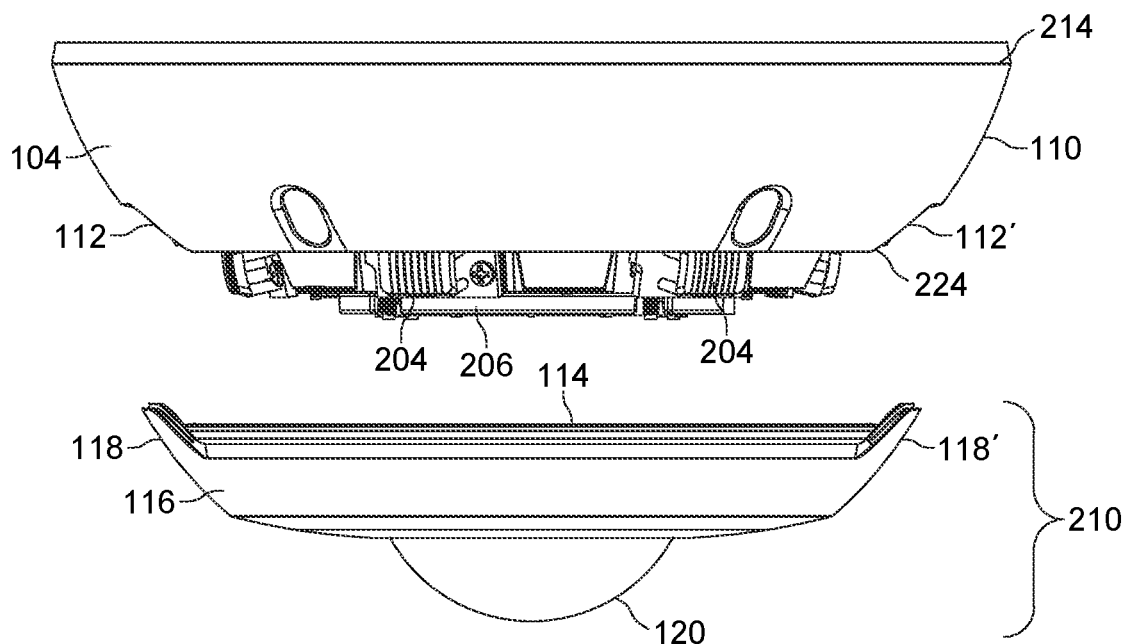
FIG. 2B is a partially assembled side view of the video camera housing formed in accordance with some embodiments.

FIG. 2B is a partially assembled side view of the video camera formed in accordance with some embodiments. This view shows two alignment tabs 118, 118' extending from the IR window ring 116 for aligning and coupling within two exterior recessed features 112, 112' formed along the edge 114 of the top housing portion 104. The recessed features 112, 112' provide improved assembly, installation and ruggedness that protects against damage to the tabs 118, 118' during drop impact. The top housing portion 104 with recessed features 112, 112' is made of a plastic suitable for protection against 20 joules on impact (IK10 rating), making it extremely safe & vandal proof. The camera dome 120 of the bottom housing portion 108 is mounted within the IR window ring 116. The sub-assembly 210 of the two housing portions 106, 108 is thus able to align and fit to the top housing portion 104. This view shows the lenslets 204 of top housing portion 104 extending outward so as to align within the IR window ring 116.

FIG. 2B further shows the first housing portion 104 being formed of a rounded exterior contoured wall 110 formed between a first larger circular opening 214 and a second smaller sized circular opening 224. The plurality of IR lenslets 204, surrounding the pass-through opening 206, protrude through the second smaller sized circular opening 224.

Figure 2C:
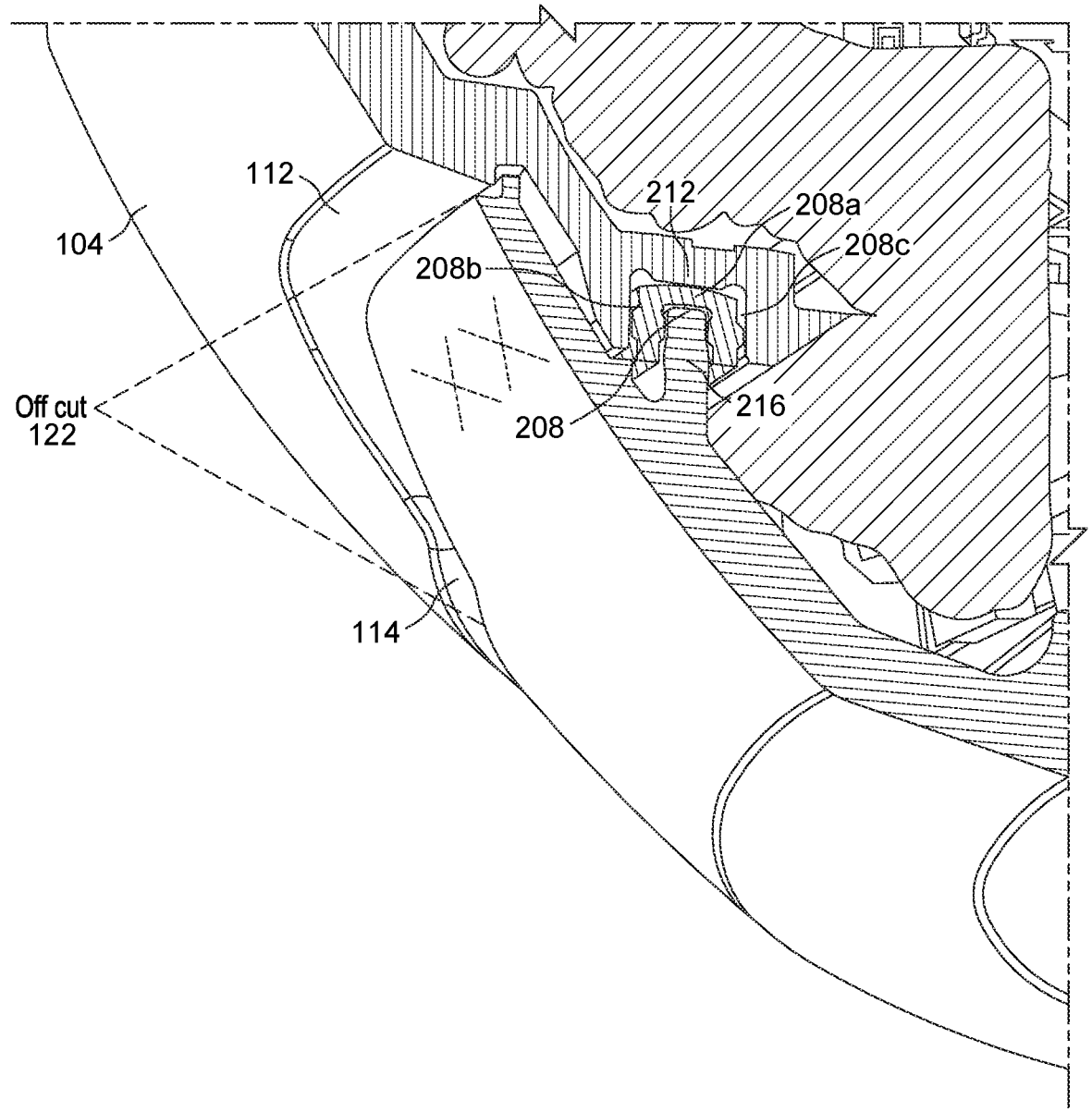
FIG. 2C is a partial cut-away view of the video camera housing formed in accordance with some embodiments.

FIG. 2C is a partial cutaway view of the assembled housing 102 showing a seal ring 208, seated over a projected flange 216 of the second housing portion 106, and retained within a rail 212 of the first housing portion 104. The seal 208 has a top seal plateau surface 208a with two side seal surfaces 208 b, 208c extending downward therefrom, so as to cover the flange 216. The seal ring 208 is held in place via the rail 212. The seal ring 208, flange 216 and rail 212 advantageously provide a circular seal between the top housing portion 104 and IR window ring 116. The sealing improves ruggedization and minimizes water intrusion.

FIG. 2C further emphasizes the protection provided to alignment tab 118 by the exterior recessed feature 112 formed along an edge 114 of top housing portion 104. The recessed alignment tab 118 frames and protects the branding insignia 124 printed thereon. The IR window ring 116 with edge 114 forming the offset parting line 122 further provide enhanced protection to the recessed alignment tab 118 and branding insignia 124 printed thereon.

FIGS. 2A, 2B and 2C show an advantageous tray shape of the IR window ring 116 formed of sloped side walls where the alignment tabs 118, 118' can be easily gripped like tray handles. The entire sub-assembly 210 formed of the combined mid and bottom housing portions can fit in the palm of a hand, so that the alignments tabs 118, 118' can be aligned into the respective recessed features 112, 112' of the top housing portion 104. Exterior recessed features 112, 112' provide a natural finger recess with affordance for ease of assembly of housing 102.

Once the top housing portion 104 is assembled with the sub-assembly 210 to form housing 102, the lenslets 204, which protrude out from the top housing portion 104, align within and face the sloped sidewalls of the IR window ring 116. The exterior recessed features 112, 112' further facilitate installation of housing 102 to a ceiling mounted apparatus (shown in other views) by allowing installers to use the recessed features 112, 112' with alignment tabs 118, 118' recessed therein as grip locations which protect the top housing portion 104 from getting dirty during installation.

Figure 3:
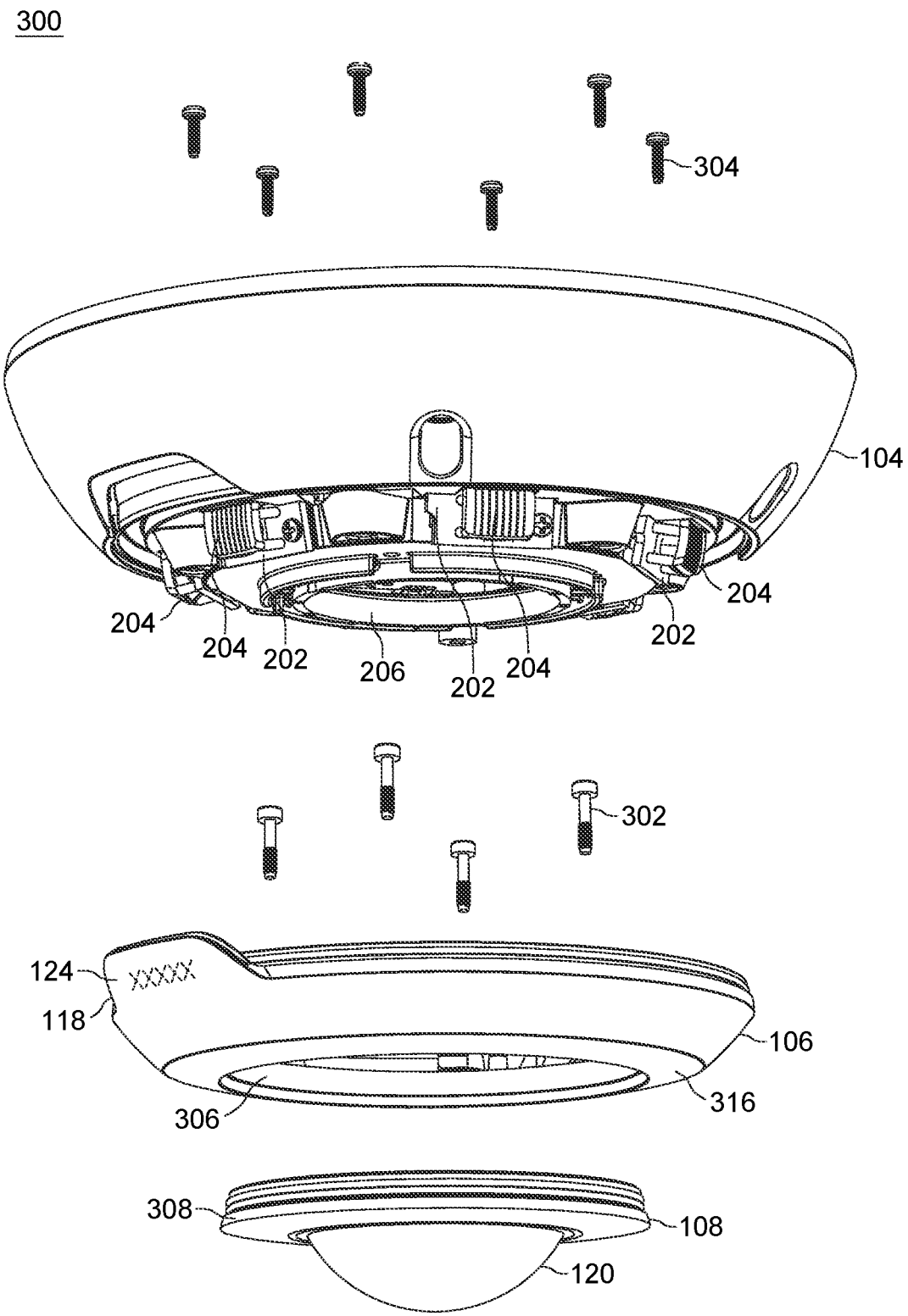
FIG. 3 is an exploded view of the video camera housing formed in accordance with some embodiments.

FIG. 3 is an exploded view 300 of the video camera formed in accordance with some embodiments. View 300 shows the top housing portion 104 having exterior recessed feature 112 integrated thereon, as well as IR circuitry 202 and IR lenslets 204 protruding therefrom. View 300 shows the mid-housing portion 106 formed of IR window ring 116 in its individual piece part form. View 300 further shows the bottom housing portion 108 having camera dome 120 in its piece part form.

A first plurality of screws 302, or other coupling means, may be used to mount the IR window ring 116 to the bottom housing portion 108 having camera dome 120. A second plurality of screws 304, or other coupling means, may be used to mount the top housing portion 104 to the combined sub-assembly of mid and bottom housing portions 106, 108 In accordance with some embodiments, the IR window ring 116 is formed of a material permeable to IR and opaque to visible light. The IR window ring 116 provides alignment tab 118 extending therefrom for aligning with the exterior recessed feature 112 of the top housing portion 104. The alignment tab 118 frames the branding insignia 124 printed thereon. Once the IR window ring 116 is aligned and secured to the top housing portion 104, IR lenslets 204 become seated within the IR window ring 116. A first plurality of screws 302, or other coupling means, may be used to mount the IR window ring 116 to the bottom housing portion 108 having camera dome 120. A second plurality of screws 304, or other coupling means, may be used to mount the top housing portion 104 to the combined sub-assembly of mid and bottom housing portions 106, 108.

The bottom housing portion 108 comprises the camera dome 120 surrounded by, and protruding from, an opaque circular base 308 of the bottom housing portion. The bottom housing portion 108 is coupled, via the opaque circular base 308, to the mid-housing portion 106 within a corresponding opening 306 of the mid housing portion 106. The opening 306 of the mid-housing portion 106 is surrounded by a flat, planar circular surface 316 of the mid-housing portion. When the mid-housing portion 106 and bottom housing portion 108 are coupled together, such as via screws 302, a flush mount is formed between the mid-housing portion and the bottom housing portion 108 through which the camera dome 120 protrudes.

Figure 4:
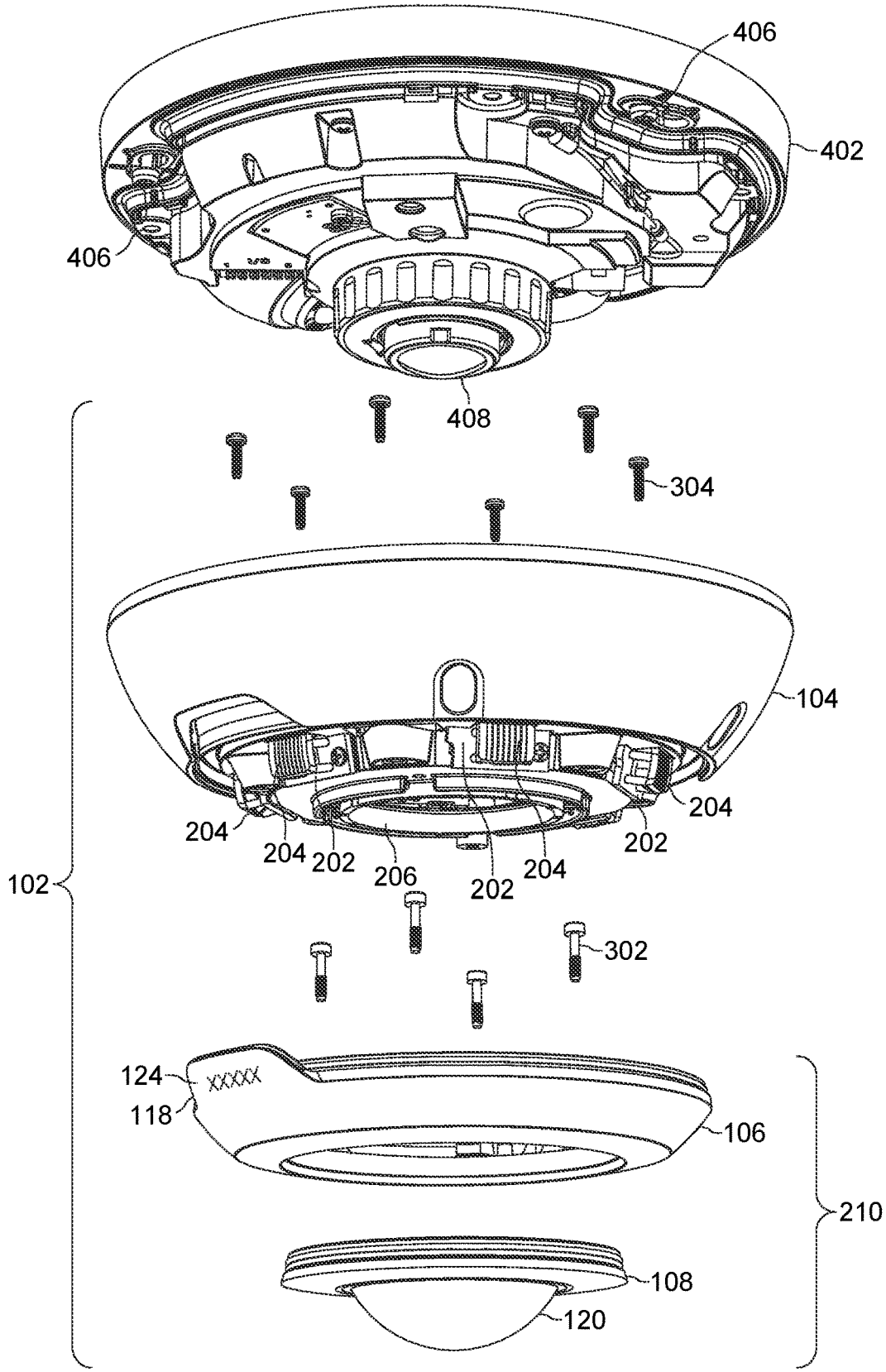
FIG. 4 is another exploded view of the video camera housing and circular mounting apparatus in accordance with some embodiments.

FIG. 4 is another exploded view 400 of the video camera housing with a circular mounting apparatus 402 in accordance with some embodiments. The circular mounting apparatus 402 includes video camera electronics and is mountable to a surface, such as a ceiling, wall or other suitable surface.

The housing 102 is formed of top housing portion 104, mid-housing portion 106, and bottom housing portion 108. Screws 302 couple the mid-housing portion 106 to the bottom housing portion 108 forming sub-assembly 210. Top housing portion 104 is then coupled to sub-assembly 210 via screws 304. This forms the housing assembly which can be shipped to an installer.

The video camera electronics of the circular mounting apparatus 402 include a camera lens 408 extending therefrom. When the housing 102 is installed to the circular mounting apparatus 402, the camera lens 408 protrudes through the pass-through opening 206 of top housing 104 and aligns within the camera dome 120 of the bottom housing portion 108.

Figure 5:
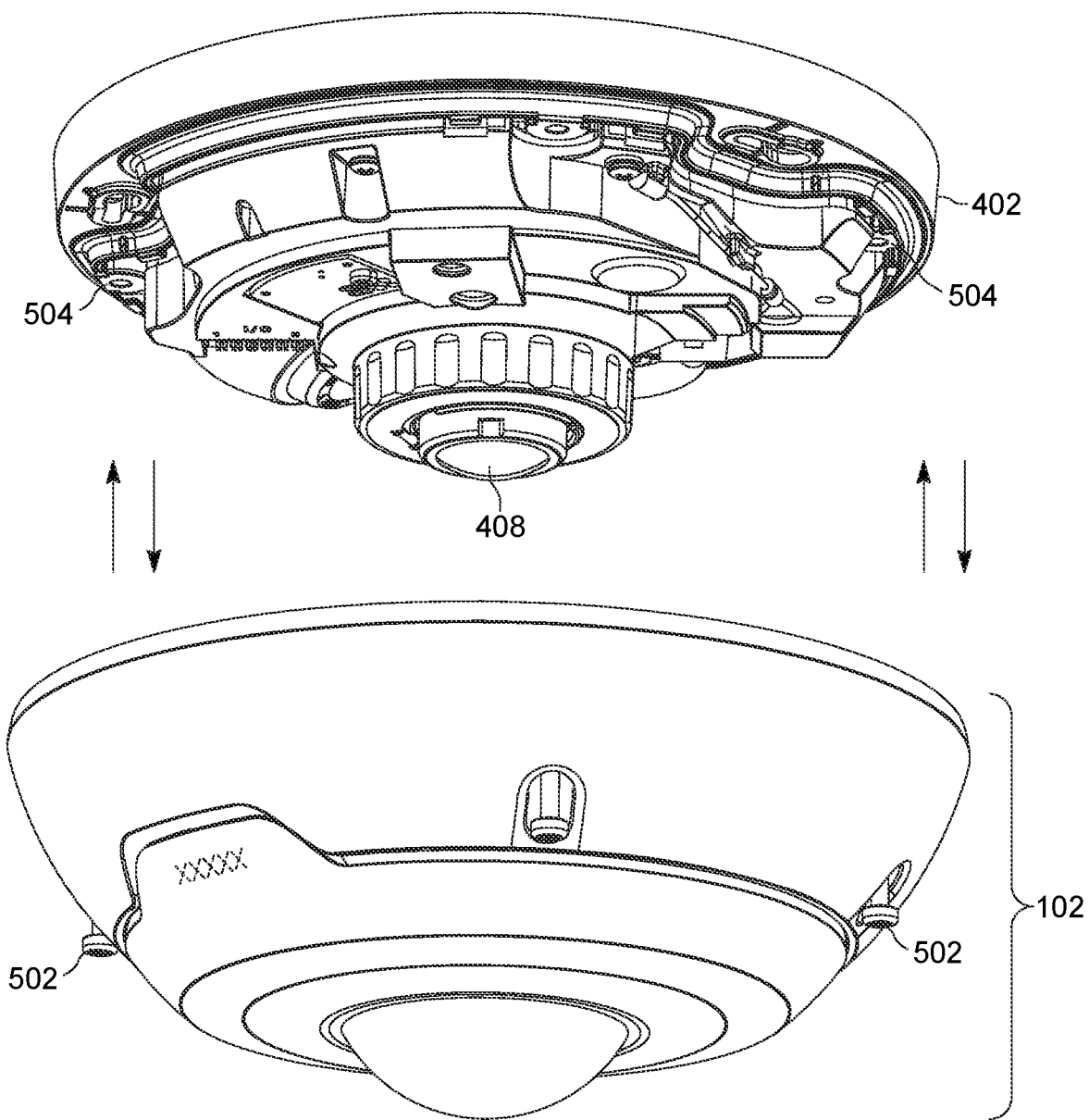
FIG. 5 is an another isometric view showing the video camera housing for attaching to and detaching from the circular mounting apparatus in accordance with some embodiments.

FIG. 5 is another view 500 of the video camera housing 102 and circular mounting apparatus 402 in accordance with some embodiments. View 500 is provided to show the advantageous manner in which the assembled housing 102 can be mounted and dismounted from the circular mounting apparatus 402 via screws 502 within the top housing portion 104 and corresponding screw inserts 504 in the circular mounting apparatus 402. Once housing 102 is removed from the circular mounting apparatus 402, then the sub-assembly 210 (FIG. 2B) can be unscrewed from top housing portion 104. Once the sub-assembly 210 has been removed from the top housing portion 104, then the bottom housing portion 108 having camera dome 120 can be removed from the mid-housing portion 106 having IR window ring 116. Thus the camera dome 120 can be easily replaced by providing a replacement bottom housing portion with new dome.

The replacement bottom housing portion with new dome can be attached to the mid-housing portion 106, thereby forming a new sub-assembly. The new subassembly is re-attached to the top housing portion 104. The entire housing 102 (with new camera dome) is then re-attached to circular mounting apparatus 402 through screws 502 and screw inserts 504.

Referring to FIGS. 1, 2A, 2B, 3, 4 and 5, the various embodiments thus provide for a video camera, comprising: a circular mounting apparatus 402 containing video camera electronics 410, and a housing 102 coupled to the mounting apparatus. The housing 102 is formed of three housing portions comprising a first top housing portion 104, a second mid-housing portion 106, and a third bottom housing portion 108. The first housing portion 104, contains IR electronics 202, and the first housing portion is formed of the rounded exterior contoured wall 110 formed between the first circular opening 214 for coupling to the circular mounting apparatus 402 and the second smaller sized circular opening 224 through which the plurality of IR lenslets 204 surrounding the pass-through opening 206 protrude. The rounded exterior contoured wall 110 has at least one exterior recessed feature 112 formed therein along the edge 114 of the second smaller sized circular opening 224.

The second housing portion 106 provides the IR window ring 116 having the alignment tab 118 extending therefrom. The alignment tab 118 may frame a printed branding insignia 124 disposed thereon. The alignment tab 118 being recessed within exterior recessed feature 112 of the first housing portion provides additional framing and protection to the branding insignia printed thereon. The IR window ring 116 is formed of the material permeable to IR and opaque to visible light. The alignment tab 118 is aligned and recessed within the exterior recessed feature 112 of the rounded exterior contoured wall 110 of the first housing portion 104. The rounded exterior contoured wall 110 of the first housing portion 104 is formed of material that blocks light, and the IR window ring 116 of the second housing portion is formed of material that is permeable to IR light. The top housing portion 104 may be formed, for example, of an aluminum casting, and the mid-housing portion 106 may be formed, for example, of a light transmissible polycarbonate.

The third housing portion 108 is formed of the opaque circular base 308 having translucent camera dome 120 protruding therefrom. The opaque circular base 308 is seated within the IR window ring 116 thereby aligning the translucent camera dome 120 with the pass-through opening 206 of the first housing portion 104. The third housing portion 108 may be formed of an opaque polycarbonate ring surrounding the dome 120 which may be formed of a translucent polycarbonate suitable for optical applications.

The opaque circular base 308 of the third housing portion 108 provides a seal preventing light from passing between the camera pass-through 206 and the IR window ring 116. The offset parting line 122 is formed between the first housing portion 104 and the second housing portion 106 to provide extra recessed protection to the alignment tabs 118, 118' and printed branding insignia 124. Hence, the alignment tabs 118, 118' and branding insignia 124 disposed thereon are well protecting against drop impact. The bottom housing portion 108 with camera dome 120 is replaceable. The video camera housing 102 may be mounted to the circular mounting apparatus 402 having the video camera electronics. The video camera may be a closed circuit television (CCTV) camera or an internet protocol (IP) camera.

Accordingly, the housing 102, provided by the various embodiments, advantageously facilitates assembly at the factory level, facilitates installation at in the field, and facilitates replacement of the camera dome.

Figure 6:
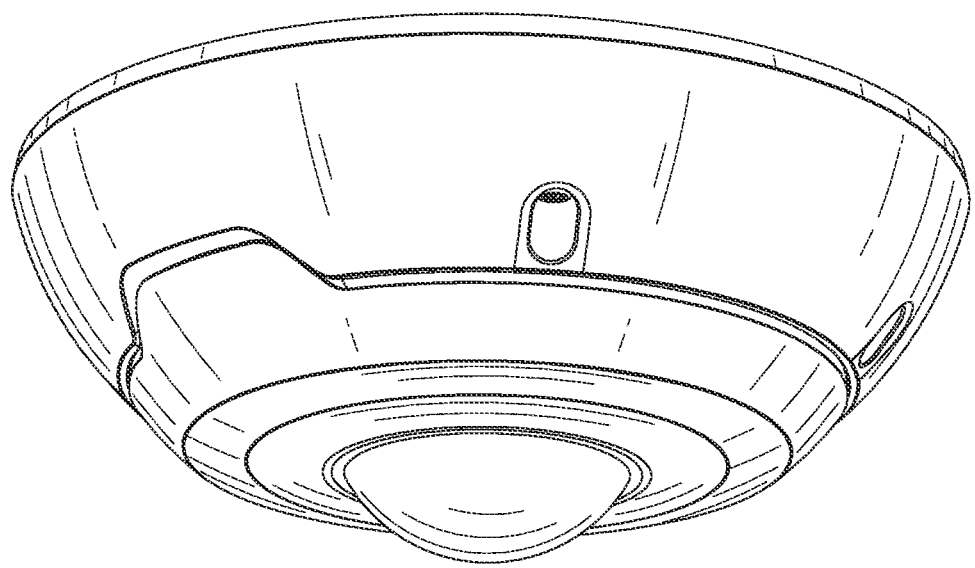
FIG. 6 is an isometric view of the video camera housing formed in accordance with some embodiments.
Figure 7:
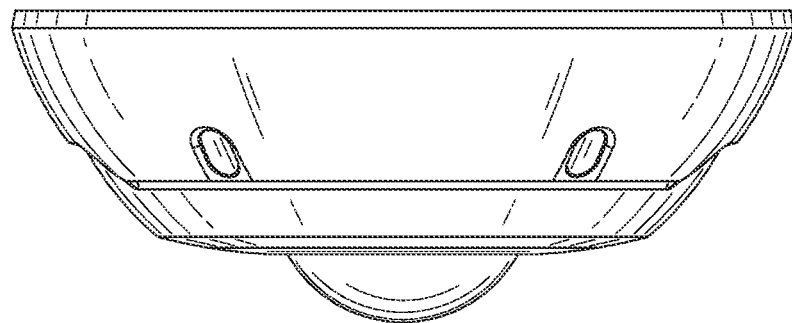
FIG. 7 is a first side view of the video camera housing formed in accordance with some embodiments.
Figure 8:
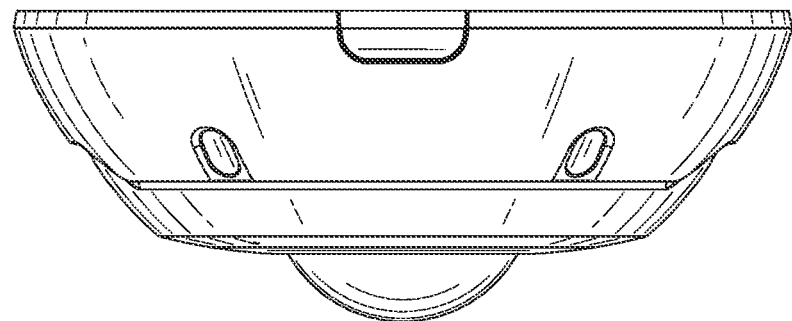
FIG. 8 is a second side view of the video camera housing formed in accordance with some embodiments.
Figure 9:
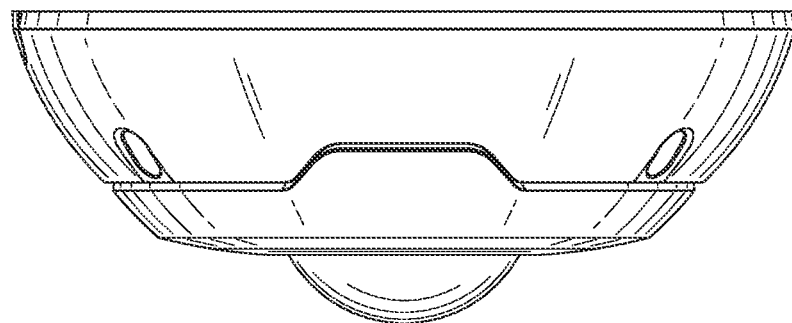
FIG. 9 is a third side view of the video camera housing formed in accordance with some embodiments.
Figure 10:
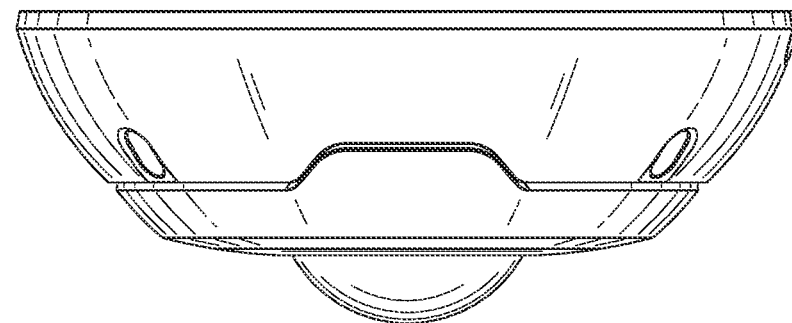
FIG. 10 is a fourth side view of the video camera housing formed in accordance with some embodiments.
Figure 11:
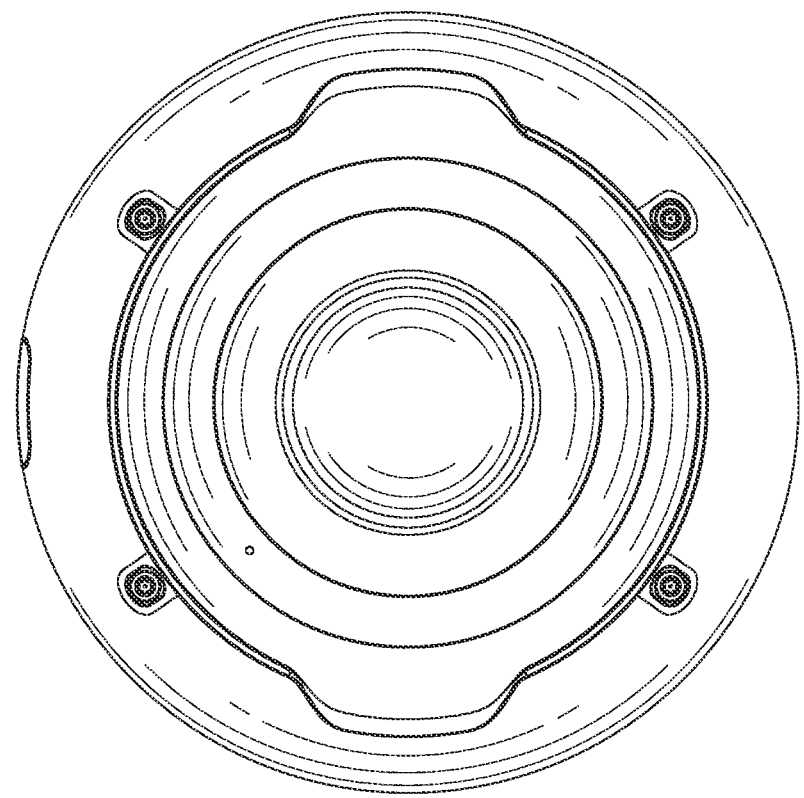
FIG. 11 is a top view of the video camera housing formed in accordance with some embodiments.
Figure 12:
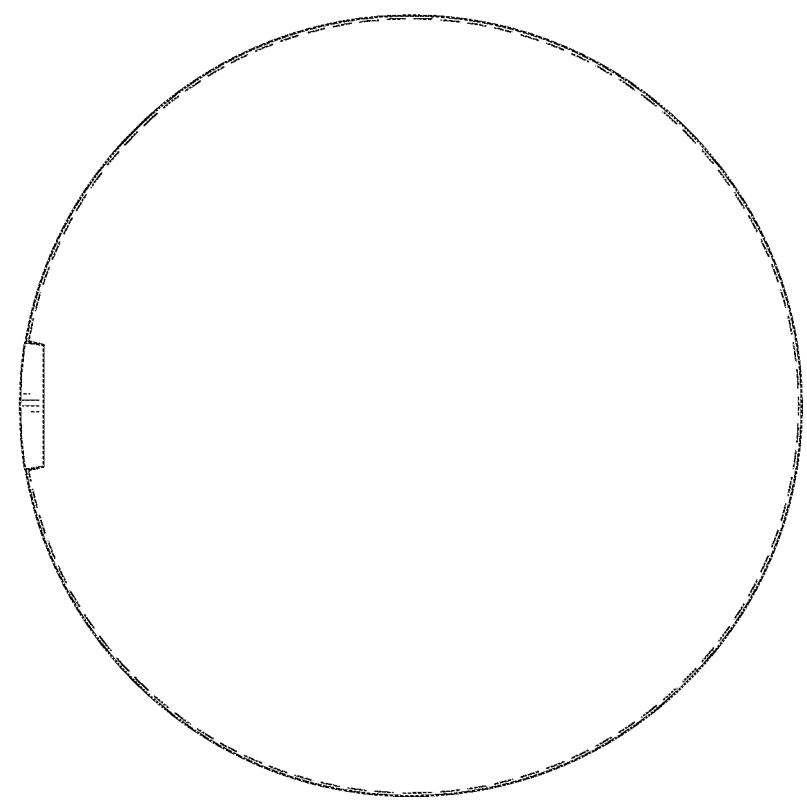
FIG. 12 is a bottom view of the video camera housing formed in accordance with some embodiments.

FIGS. 6-12 show design views of the video camera housing 102 in accordance with some embodiments. FIG. 6 is an isometric view of the video camera housing formed in accordance with some embodiments. FIG. 7 is a first side view of the video camera housing formed in accordance with some embodiments. FIG. 8 is a second side view of the video camera housing formed in accordance with some embodiments. FIG. 9 is a third side view of the video camera housing formed in accordance with some embodiments. FIG. 10 is a fourth side view of the video camera housing formed in accordance with some embodiments. FIG. 11 is a top view of the video camera housing formed in accordance with some embodiments. FIG. 12 is a bottom view of the video camera housing formed in accordance with some embodiments.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A video camera, comprising:
   a housing having a plurality of housing portions for camera and IR electronics, wherein one of the plurality of housing portions comprises an IR window ring formed of a material permeable to IR and opaque to visible light, wherein the IR window ring has an alignment tab extending therefrom for aligning with an exterior recessed feature of a top housing portion having IR circuitry and IR lenslets, wherein a sealing ring provides sealing between the top housing portion and the remainder of the plurality of housing portions.

2. The video camera of claim 1, wherein the alignment tab frames and protects a branding insignia printed on an exterior surface of the alignment tab.

3. The video camera of claim 1, further comprising:
   a bottom housing portion with a camera dome extending therefrom, the bottom housing portion being mounted within the IR window ring.

4. The video camera of claim 3, wherein the bottom housing portion mounted within the IR window ring form a sub-assembly, the sub-assembly being removable from and attachable to the top housing portion.

5. The video camera of claim 3, wherein the alignment tab extending and exterior recessed feature provide a natural finger recess with affordance to facilitate gripping during assembly, during installation, and during removal and replacement of the camera dome.

6. The video camera of claim 1, further comprising:
   an offset parting line formed between the top housing portion and the IR window ring.

7. The video camera of claim 1, wherein the housing is attachable to and removable from a circular mounting apparatus containing video camera electronics.

8. The video camera of claim 1, wherein the video camera is one of a closed circuit television (CCTV) camera or an internet protocol (IP) camera.

9. A video camera, comprising:
   a first top housing portion with a plurality of IR lenslets that surround a camera pass-through opening;
   a second mid-housing portion with a ring made of material permeable to IR and opaque to visible light;
   a third bottom housing portion with an opaque circular ring seated within the second mid-housing and aligned with the camera pass-through opening; and
   a sealing ring to provide sealing between the first top housing portion and the second mid-housing portion.

10. The video camera of claim 9, wherein an offset parting line is formed between the top housing portion and the mid-housing portion.

11. The video camera of claim 9, wherein the ring has an alignment tab extending therefrom.

12. The video camera of claim 11, wherein the alignment tab frames a branding insignia printed thereon.

13. The video camera of claim 11, wherein the wherein the alignment tab aligns with an exterior recessed feature of the top housing portion.

14. The video camera of claim 13, wherein the alignment tab and exterior recessed feature provide a natural finger recess with affordance to facilitate gripping during assembly, during installation, and during removal and replacement of the camera dome.

15. The video camera of claim 9, wherein the housing further comprises a circular mounting apparatus coupled to the first top housing portion for mounting to a surface.

16. The video camera of claim 9, wherein the video camera is one of a closed circuit television (CCTV) camera or an internet protocol (IP) camera.

* * * * *